United States Patent
Iyer et al.

(10) Patent No.: US 11,017,183 B2
(45) Date of Patent: May 25, 2021

(54) SYSTEM AND METHODS FOR AUTO-TRANSLATING TEXT MESSAGES

(71) Applicant: T-MOBILE USA, INC., Bellevue, WA (US)

(72) Inventors: Karthik Iyer, Bellevue, WA (US); Michael Kim, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 89 days.

(21) Appl. No.: 16/381,107

(22) Filed: Apr. 11, 2019

(65) Prior Publication Data

US 2020/0327199 A1 Oct. 15, 2020

(51) Int. Cl.
| | |
|---|---|
| *G06F 40/58* | (2020.01) |
| *G06F 40/263* | (2020.01) |
| *H04L 29/06* | (2006.01) |
| *H04W 4/12* | (2009.01) |

(52) U.S. Cl.
CPC ........... *G06F 40/58* (2020.01); *G06F 40/263* (2020.01); *H04L 65/1006* (2013.01); *H04W 4/12* (2013.01)

(58) Field of Classification Search
CPC .................. G06F 40/58; G06F 40/263; H04L 65/1006; H04W 4/14; H04W 4/12
See application file for complete search history.

(56) References Cited

U.S. PATENT DOCUMENTS

2004/0266462 A1* 12/2004 Chava .................... A61P 35/00
455/466
2013/0066624 A1 3/2013 Pattan et al.

FOREIGN PATENT DOCUMENTS

KR 20060083485 A * 7/2006

OTHER PUBLICATIONS

Extended European Search Report for EP Application No. 20169454.4 dated Sep. 2, 2020.
Anonymous: "Rich Communication Services"—1-15 Wikipedia, retrieved Aug. 24, 2020.
GSM Association, Rich Communication Suite 9.0 Advanced Communications Services and Client Specification Version 10.0 dated Dec. 6, 2018.

* cited by examiner

*Primary Examiner* — Yogeshkumar Patel
(74) *Attorney, Agent, or Firm* — Marshall, Gerstein & Borun LLP (57) ABSTRACT

Embodiments described herein relate to a language translation services within a Rich Communication Services (RCS) messaging infrastructure to facilitate translating RCS message sent from an RCS-compatible sender device to an RCS-compatible recipient device or a legacy recipient device. An RCS messaging server (RMS) may detect a language value corresponding to a language preference parameter to translate the RCS message based on the language value. The language value may be passed to the RMS (1) from the sender device via an invite message of the Session Initiation Protocol (SIP), (2) from the recipient device via an accept message of the SIP, (3) from the RCS message itself, or (4) via communication with a home subscription server (HSS).

17 Claims, 10 Drawing Sheets

SYSTEM AND METHODS FOR AUTO-TRANSLATING TEXT MESSAGES

FIELD OF THE DISCLOSURE

The present disclosure relates to automatically translating messages, and, more particularly, to automatically translating mobile text messages without leaving a native client messaging application.

BACKGROUND

Modern cellular communication networks include a Rich Communication Services (RCS) messaging infrastructure for delivering IP multimedia services, such as telephony, voice over IP (VoIP), instant messaging, video messaging, and/or other services. In many situations, users desire to communicate with each other in different languages via text messaging. The conventional RCS messaging infrastructure does not permit automatic translation of an RCS text message from the original language to a second language. The typical workaround requires a recipient to perform the following steps: manually "copy" the content of the original text message from the native client messaging application, leave the native client messaging application, open a third-party translation application, manually "paste" the content of the original text message into the third-party translation application to view the translated message.

What is desired is an RCS messaging infrastructure that supports seamless and automatic translation of languages in a manner convenient to the users without leaving the native client messaging application.

BRIEF SUMMARY

In one aspect, a computer-implemented method for translating a rich communication services (RCS) message may include (1) receiving, by one or more processors of an RCS Messaging Server (RMS) and from a first device that is RCS-compatible, an invite message to request an RCS session for delivery of the RCS message between the first device and a second device that is RCS-compatible; (2) receiving, by the one or more processors of the RMS and from the second device, an accept message in response to the invite message; (3) receiving, by the one or more processors of the RMS, the RCS message in a first language from the first device; (4) identifying, by the one or more processors of the RMS, a language preference configuration parameter included in at least one of the invite message, the accept message, or the RCS message; (5) obtaining, by the one or more processors of the RMS, a language preference value of the second device based upon a language preference configuration parameter; (6) generating, by the one or more processors of the RMS, a translation of the RCS message in a second language from the RCS message in the first language in accordance with the language preference value of the second device; and (7) transmitting, by the one or more processors of the RMS, the translation of the RCS message in the second language to the second device.

In another aspect, a computer-implemented method for translating an RCS message may include (1) receiving, by one or more processors of an RMS and from a first device that is RCS-compatible, an invite message to request an RCS session for delivery of the RCS message between the first device and a second device that is RCS-compatible; (2) receiving, by the one or more processors of the RMS and from the second device, an accept message in response to the invite message; (3) receiving, by the one or more processors of the RMS, the RCS message in a first language from the first device; (4) transmitting, by the one or more processors of the RMS, a language request to a home subscriber system (HSS) for accessing an account associated with the first device or the second device; (5) identifying, by the one or more processors of the RMS, a language preference configuration parameter included in the account; (6) obtaining, by the one or more processors of the RMS, a language preference value of the second device based upon the language preference configuration parameter; (7) generating, by the one or more processors of the RMS, a translation of the RCS message in the second language from the RCS message in the first language in accordance with the language preference value of the second device; and (8) transmitting, by the one or more processors of the RMS, the translation of the RCS message in the second language to the second device.

In yet another aspect, a computer-implemented method for translating an RCS message may include (1) receiving, by one or more processors of an RMS and from a first device that is RCS-compatible, an SIP message in a first language for delivery of a text message (i.e., a portion of the SIP message) in a first language to a second device that is short message service (SMS)-compatible; (2) transmitting, by the one or more processors of the RMS, a language request to a home subscriber system (HSS) for accessing an account associated with the first device or the second device; (3) identifying, by the one or more processors of the RMS, a language preference configuration parameter included in the account; (4) obtaining, by the one or more processors of the RMS, a language preference value of the second device based upon the language preference configuration parameter; (5) generating, by the one or more processors of the RMS, a translation of the text message in the second language from the text message in the first language in accordance with the language preference value of the second device; and (6) transmitting, by the one or more processors of the RMS, the translation of the text message to an SMS center (SMSC) for forwarding of the translation of the text message to the second device.

Systems or computer-readable media storing instructions for implementing all or part of the systems and methods described above may also be provided in some aspects. Systems for implementing such methods may include or one or more mobile computing devices and/or one or more servers. Additional or alternative features described hereinafter may be included in some aspects.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

The described implementations provide devices, systems, and methods that allow language translation services to be provided within a Rich Communication Services (RCS) messaging infrastructure. In certain described embodiments, language translation services within the RCS messaging infrastructure facilitate translating an RCS message sent from an RCS-compatible sender device to an RCS-compatible recipient device. In some embodiments using a "session-based" approach, the RCS messaging infrastructure may extend the Session Initiation Protocol (SIP) to enable either the sender device or the recipient device to identify a preferred language while establishing a session between the sender device or the recipient device. That is, client messaging applications executing on the sender device and the recipient device may be configured to input a language preference parameter into the invite message and accept message, respectively. An RCS messaging server (RMS) of an Internet Protocol (IP) Multimedia Subsystem (IMS) may be configured to detect the language preference parameter in order to translate the original RCS message into the preferred language as indicated by the language preference parameter upon an established session between the sender device and the recipient device.

Advantageously, such embodiments permit efficient use of available network bandwidth by utilizing pre-existing invite and accept messages rather than using additional dedicated communication streams to communicate language information. Further, such embodiments improve the ability of the user to designate a language preference. If the sender knows the language preference of the recipient, the sender may designate the language preference in the invite message. If the sender does not know the language preference of the recipient, the recipient may designate the language preference in the accept message.

In further embodiments, using a "message-based" approach, the format of the RCS message may itself be extended to enable the sender device to input the language preference parameter. That is, a client messaging application executing on the sender device may be configured to input a language preference parameter into the RCS text message. The RMS may be configured to detect the language preference parameter included in the RCS text message in order to translate the original RCS message into the preferred language as indicated by the language preference parameter. In such embodiments, SIP need not be extended.

Advantageously, such embodiments permit use of available network bandwidth by utilizing the pre-existing RCS message rather than using additional dedicated communication streams to communicate language information. Further, such embodiments improve the ability of the user to designate a language preference. If the sender knows the language preference of the recipient, the sender may designate the language preference in the RCS message for RMS translation, alleviating the need for the recipient to manually translate the received message.

In yet further embodiments, the RMS may utilize a "subscription-based" approach or "account-based" approach by accessing a home subscription server (HSS) to obtain subscription-level or account-level information pertaining to language preferences, respectively. That is, the sender or recipient may login to their account hosted by the HSS to specify language preferences on a recipient-basis (i.e., at a subscription-level) or independent of sender/recipient (i.e., at an account-level) to inform the RMS to translate the RCS message into the preferred language. In such embodiments, neither the SIP nor the format of the RCS text message needs to be adjusted.

As an example of the "subscription-based" approach, if Alice (sender) knows that Bob (recipient) would prefer to receive text messages in Spanish and that Charlie (recipient) would prefer to receive text messages in Korean, Alice may login to her account hosted by the HSS to specify appropriate language preferences of outgoing texts to Bob and Charlie. The HSS may assign such language preferences to Bob and Charlie using their account numbers, phone numbers, or other suitable identifiers. Similarly, if Bob (recipient) would prefer to receive text messages from Alice (sender) in Spanish yet receive text messages from Charlie (sender) in English, Bob may login to his account hosted by the HSS to specify appropriate language preferences of incoming texts from Alice and Charlie. The "subscription-based" approach may be useful for multilingual users who may desire to customize language preferences for particular users. In contrast, an "account-based" approach may allow a sender or recipient to select a particular language for all users. The sender or recipient may login to their accounts hosted by the HSS to specify appropriate language preferences of outgoing texts or incoming texts regardless of the recipient or sender, respectively. The "account-based" approach may be useful for a sender or recipient who may desire to send or view text messages in only one language.

Advantageously, such embodiments permit efficient use of available network bandwidth by utilizing the HSS rather than using additional dedicated communication streams to communicate language information. Further, such embodiments improve the ability of the user to designate a language preference on a local or global level under the "subscription-based" approach and "account-based" approach, respectively.

In certain described embodiments, language translation services within the RCS messaging infrastructure facilitate translating a message sent from an RCS-compatible sender device to a legacy recipient device, such as a short message service (SMS)-compatible device. In such embodiments, the RMS may obtain language preferences in any of the manners described above. However, to support legacy recipient devices, the RMS may forward translated messages to a legacy server, such as an SMS center (SMSC), which in turn converts the translated message into a format suitable for the legacy recipient device.

Advantageously, by enabling a single source (i.e., the RMS) to handle translation services rather than duplicating translation functionality within the SMSC, such embodiments enable not only RCS-compatible devices to send and receive messages that are or have been automatically translated by the RMS, but also permits legacy devices to receive translated messages automatically.

Figure 1:
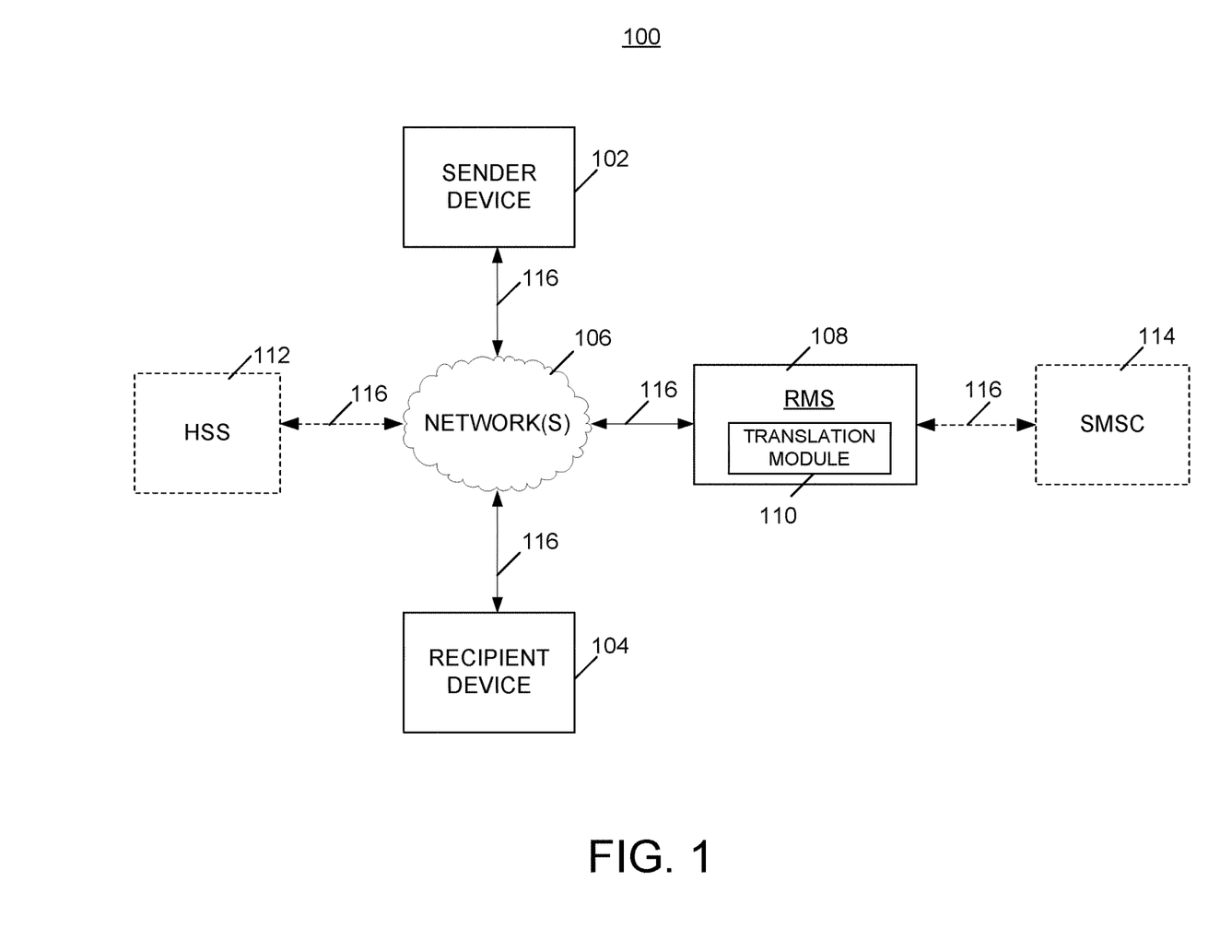
FIG. 1 is a block diagram illustrating a communication system for implementing an RCS messaging infrastructure with language translation services according to some implementations.

FIG. 1 illustrates an example telecommunication system 100, which may be provided and/or supported by a telecommunications service provider. The system 100 includes an RCS messaging server (RMS) 108 of an IMS that provides communications between multiple user equipment (UE) devices (including sender device 102 and recipient device 104) via one or more networks 106. For ease of explanation, UE devices may include a sender device 102 that can be operated by a sender user and a recipient device 104 that can be operated by a recipient user in the following discussion. Communications may be between UE devices of the same service provider and/or may be between UE devices supported by different service providers.

The UE devices 102, 104 may include any suitable mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, smart watches, etc.), and/or similar mobile devices. Although this description predominantly describes the UE devices 102, 104 as being "mobile" or "wireless," (e.g., configured to be carried and moved around), it is to be appreciated that the UE devices 102, 104 may represent various types of communication devices that are generally stationary as well, such as smart speakers, televisions, desktop computers, game consoles, set top boxes, smart home appliances, and the like. UE devices 102, 104 can include user cellular equipment or other telecommunications or computing devices communicatively connectable with other computing devices via the RMS 108.

Each of the UE devices 102, 104 and RMS 108 may be configured to communicate with the one or more networks 106 via one or more communication links 116. The one or more networks 106 may include an access network, a core network, and/or an Internet network. Example access networks include LTE, WIFI, GSM EDGE Radio Access Network (GERAN), UMTS Terrestrial Radio Access Network (UTRAN), and other cellular access networks. A cellular network may provide wide-area wireless coverage using a technology such as GSM, Code Division Multiple Access (CDMA), UMTS, LTE, 5G NR, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. The one or more communication links 116 in some examples propagate electromagnetic signals that utilize various protocols, such as LTE, Internet Protocol (IP), Session Initiation Protocol (SIP), or other suitable protocols.

Each of the UE devices 102, 104 may also include one or more processors (e.g., microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs)) and one or more computer readable media (e.g., RAM, ROM, EEPROM, flash memory or other memory technology). The computer readable media may be used to store data and to store instructions that are executable by the one or more processors to perform various functions as described herein. For instance, the computer readable media may store information of one or more capabilities or preferred or available session attributes of the UE devices 102, 104, such as credentials used for access, e.g., to IMS or RCS services.

The computer readable media may also store one or more native client applications and a user interface (UI), such as a touchscreen or other device for presenting information to a user and receiving commands from the user, associated with the one or more native client applications. One of the native client applications may permit a user to originate and terminate communication sessions associated with the UE device. In some examples, the native client application may include computer instructions that when executed cause the UE device to transmit a service message indicating the destination and the information of the session attribute to the RMS 108. As used herein, a "session attribute" is a type, identity, capability, or party of a communication session determined by or at the request of a party of the communication session, or determined in response to a message from a party of the communication session. To permit a user to originate and terminate communication sessions associated with the UE device, the UI may include a session-initiating user interface control (e.g., a touchscreen button), to indicate that a communication session should be initiated. When a sender of sender device 102 desires to text a recipient of recipient device 104, sender device 102 transmits an initiation request in response to actuation by the sender of a "send" control. The initiation request is an example of a service message of a communication session. A service message includes information of a destination, e.g., recipient device 104 with which sender device 102 is requesting a session be established. The service message may also include information of a session attribute, e.g., one or more media capabilities of the sender device 102 or protocol types of the communication session. In an example, the service message includes a SIP INVITE message having a Session Description Protocol (SDP) body including a session description, e.g., the information of the session attribute. In an example, for a text message from Alice to Bob, the session attributes can include Alice as the sender, Bob as the recipient, and a protocol identifier indicating whether the text message is being carried via the Short Message Service (SMS) protocol or the RCS Message Session Relay Protocol (MSRP). The RMS 108 may direct the text messages between the UE devices 102, 104 based on the session attribute.

The one or more native client applications may additionally include computer instructions that when executed cause the UE device to transmit a text message. In some embodiments, the native client application may enable a sender user to indicate a language preference of the recipient user in the text message (if known). Hence, the UI may include a language preference interface control (e.g., a touchscreen button), to indicate that a language preference should be included with the text message. For example, if Alice desires to send a text message to Bob in the English language but knows that Bob would prefer to read the text message in Spanish, the native client application may receive the language preference of Spanish from Alice and insert a representation (e.g., flag, bit(s), country code, etc.) of the language preference into the header or payload of the text message prior to communicating the text message to the RMS. In this way, upon receiving the text message with the embedded language preference representation, the RMS may be informed to translate the RCS message into the preferred language.

The RMS 108 is communicatively coupled with UE devices 102, 104, and may be configured to receive, from sender device 102 of a communication session, a service message including information of a first session attribute and associated with identification information of recipient device 104 of the communication session. The RMS 108 can retrieve, from an authorization registry, authorization information corresponding to the identification information. In response to the authorization information indicating the first capability is not permitted, the RMS 108 can determine a status message based at least in part on the service message, and transmit the status message via a communications interface.

Figure 2:
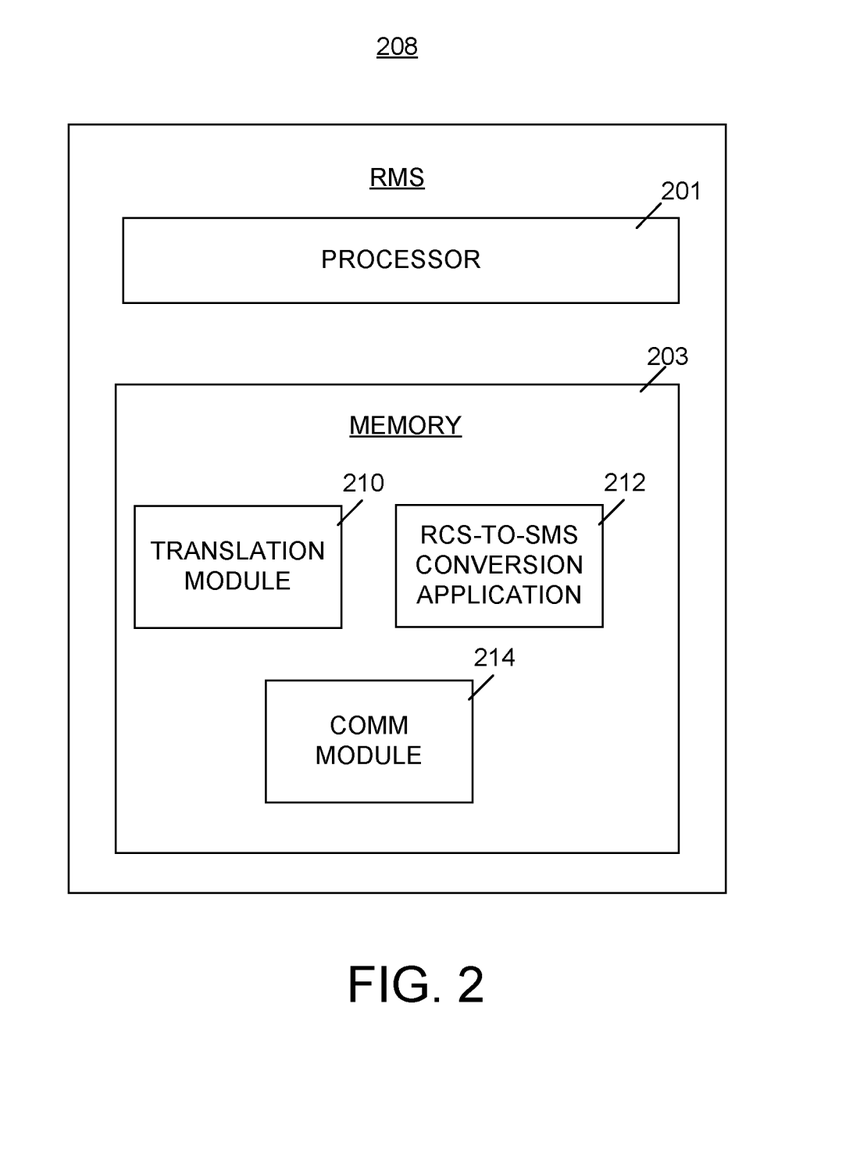
FIG. 2 is a block diagram illustrating relevant high-level components of an RMS device that may be used to implement various aspects described herein.

FIG. 2 illustrates an example configuration of an RMS 208, such as the RMS 108. RMS 208 may include one or more processors 201, and one or more memories 203, similar to those described above with respect to UE devices 102, 104. The memory 203 comprises a non-transitory computer readable storage medium, such as a disk drive, flash drive, data storage circuitry, or some other hardware memory apparatus, and may be used to store computer programs, firmware, or some other form of machine-readable processing instructions.

In some embodiments, the memory 203 may include processor-executable instructions of a translation module 210, that when executed by the processor 201, translates RCS messages from one language (e.g., English) to another language (e.g., Spanish). In other embodiments, rather than having a translation module 210 integrated within the RMS 208, the RMS 208 may be communicatively connected with a translation service (e.g., a server) separate and external to the RMS 208 and retrieve translations from the external translation service via processor 201 for example. In some embodiments, the memory 203 may include processor-executable instructions of an RCS-to-SMS conversion application 212, that when executed by the processor 201, converts RCS formatted data messages to SMS formatted data messages. The memory 203 may also include an operating system, utilities, drivers, network interfaces, applications, or some other type of software (not shown).

In some implementations, RMS 208 is communicatively connected with an authorization registry (e.g., HSS 112 as shown in FIG. 1 via communication link 116) separate from the RMS 208. RMS 208 may retrieve information from HSS 112 pertaining to language preferences of the sender device 102 or recipient device 104 via an API, for example. Accordingly, in some embodiments, the memory 203 may include processor-executable instructions of a communication module 214, that when executed by the processor 201, transmits a language request to HSS 112 for accessing and receiving the language preference.

In some implementations, RMS 208 is communicatively connected with a legacy server (e.g., SMSC 114 as shown in FIG. 1) separate from RMS 208. If recipient device 104 is a legacy device, such as a short message service (SMS)-compatible device, for example, the RMS may forward translated messages to a legacy server, such as an SMS center (SMSC), which in turn converts the translated message into a format suitable for the legacy recipient device. Accordingly, in some embodiments, the memory 203 may include processor-executable instructions of a communication module 214, that when executed by the processor 201, forward translated messages to SMSC 114 for delivering text messages to legacy recipient devices.

Although RMS 208 is illustrated as a single server, it should be understood that functionalities of RMS 208 may be distributed across multiple servers—including devices in different geographic areas.

Figure 3:
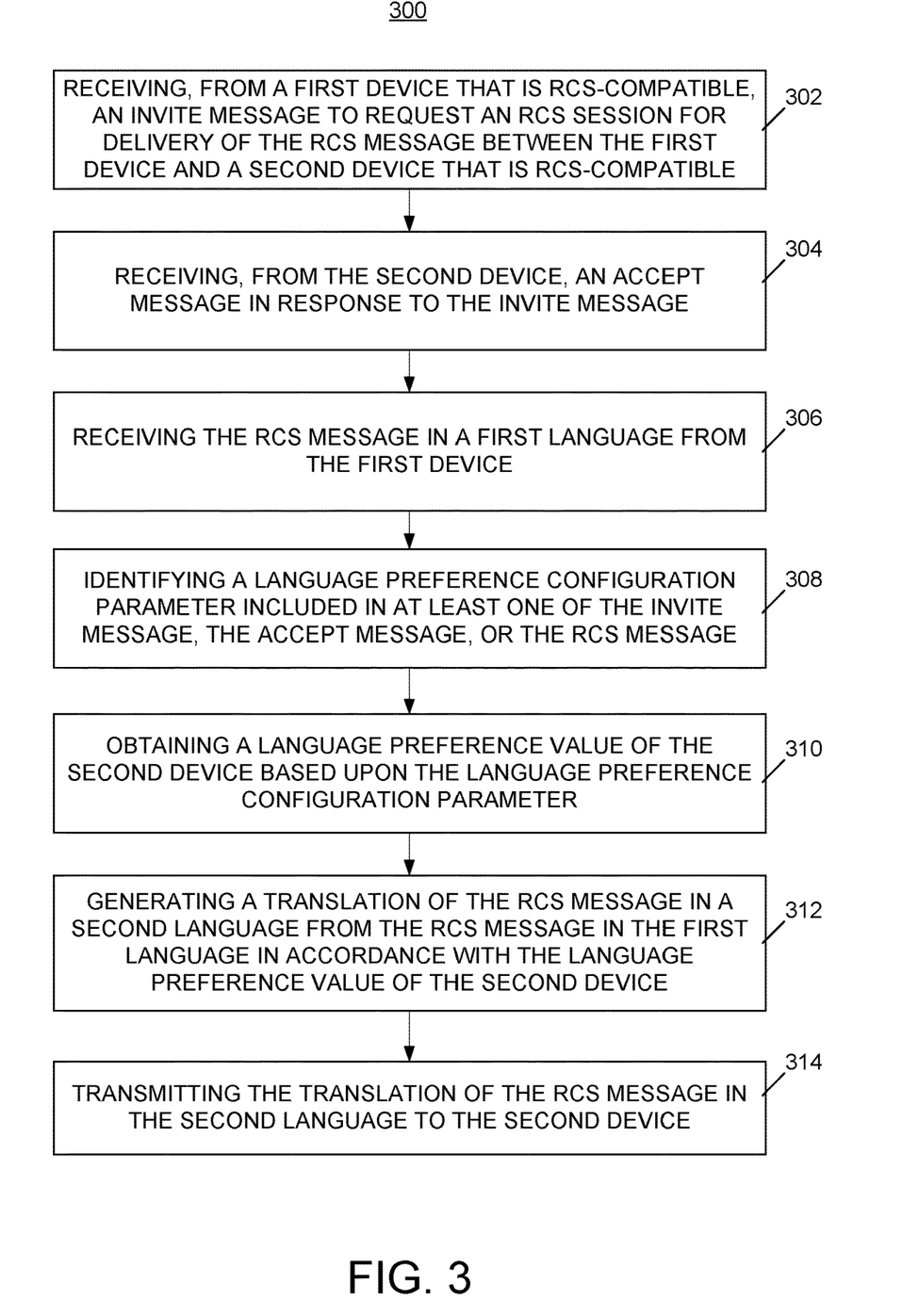
FIG. 3 is a flow diagram illustrating an example method of providing language translation services for messaging between RCS-compatible user devices according to some implementations.

FIG. 3 illustrates an example method 300 in which various example embodiments may operate. Method 300 may be carried out by an RMS (e.g., RMS 108) to enable an RCS text message to be translated and delivered from an RCS-compatible sender device to an RCS-compatible recipient device.

As shown in block 302, an RMS (e.g., RMS 108) may receive, from an RCS-compatible sender device (e.g., sender device 102), an invite message to request an RCS session for delivery of an RCS text message to an RCS-compatible recipient device (e.g., recipient device 104) in accordance with the SIP standard.

As shown in block 304, upon transmitting the invite message to recipient device 104, RMS 108 may receive an accept message (e.g., "200 OK") in response to the invite message from recipient device 104. Receipt of the accept message signifies that an RCS session has been established between the sender device 102 and the recipient device 104 via the RMS 108, in which case RCS text messages may be exchanged between the UE devices 102, 104 using the Message Session Relay Protocol (MSRP).

As shown in block 306, RMS 108 may receive an RCS text message in a particular language from sender device 102. Upon receipt, as shown in block 308, RMS 108 may generally identify a language preference configuration parameter to determine the preferred language of the recipient device 104, i.e., the language into which the RCS text message should be translated. As will be described further below with respect to FIGS. 4-6, RMS 108 may identify the language preference configuration parameter from the invite message received from the sender device 102, the accept message received from the recipient device 104, or the RCS text message itself, respectively.

As shown in block 310, RMS 108 may obtain a language preference value of the recipient device 104 based upon the language preference configuration parameter. The language preference value may be unique to a particular language, and may be in any suitable representation (e.g., bit representation, ASCII representation, country code representation, etc.).

As shown in block 312, RMS 108 may generate a translation of the RCS text message from the original-language RCS text message sent from the sender device 102 to the preferred language in accordance with the language preference value of the recipient device 104. RMS 108 may include a translation module to handle the translation services, or communicate with an external translation service via an API, for example.

As shown in block 314, RMS 108 may transmit the translated RCS message to the recipient device 104. Such transmission may occur via the network 106.

Figure 4:
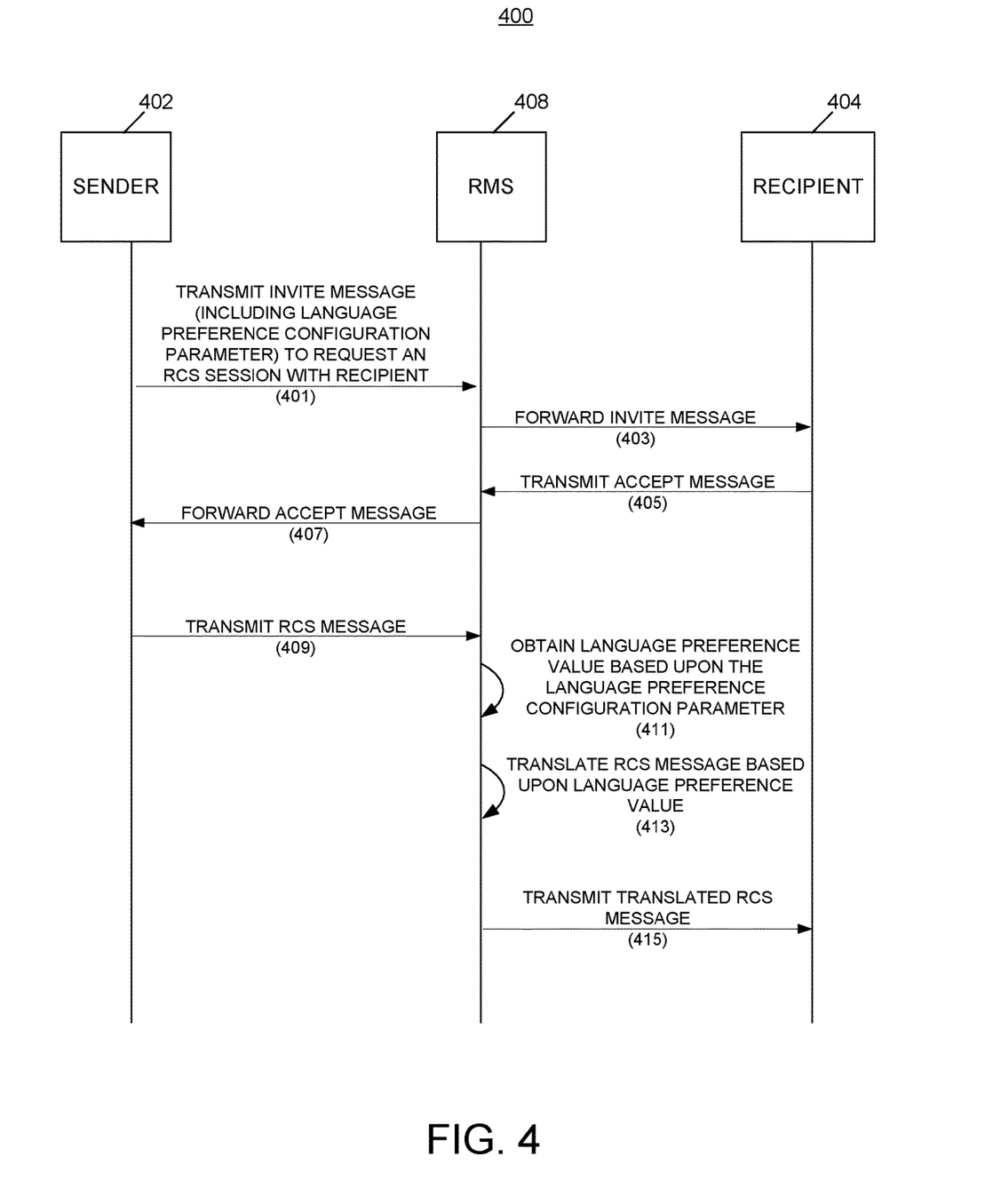
FIG. 4 is a sequence diagram of a message flow, wherein a language preference is included in an invite message according to some implementations.

FIG. 4 illustrates an example message flow 400, wherein a language preference (i.e., a language preference configuration parameter and its associated value) is included in an invite message, according to an embodiment. As shown, sender device 402 (e.g., sender device 102) may transmit (401) an invite message that includes a language preference configuration parameter to request an RCS session with recipient device 404 (e.g., recipient device 104). That is, RMS 408 (e.g., RMS 108) may receive the invite message and forward (403) the invite message to recipient device 404. The recipient device 404 may transmit (405) an accept message in response to the invite message back to the RMS 408, which in turn forwards (407) the accept message on to the sender device 402, thereby establishing an RCS session between the sender device 402 and the recipient device 404. Moreover, RMS 408 is aware of the language preferred by the recipient device 404 (as indicated by the sender device 402) while establishing the RCS session. The sender device 402 may proceed to transmit (409) an RCS text message to RMS 408, which in turn obtains (411) the language preference value corresponding to the language preference configuration parameter and subsequently translates (413) the RCS text message based upon the language preference value. RMS 408 may proceed to transmit (415) the translated RCS text message to recipient device 404.

Figure 5:
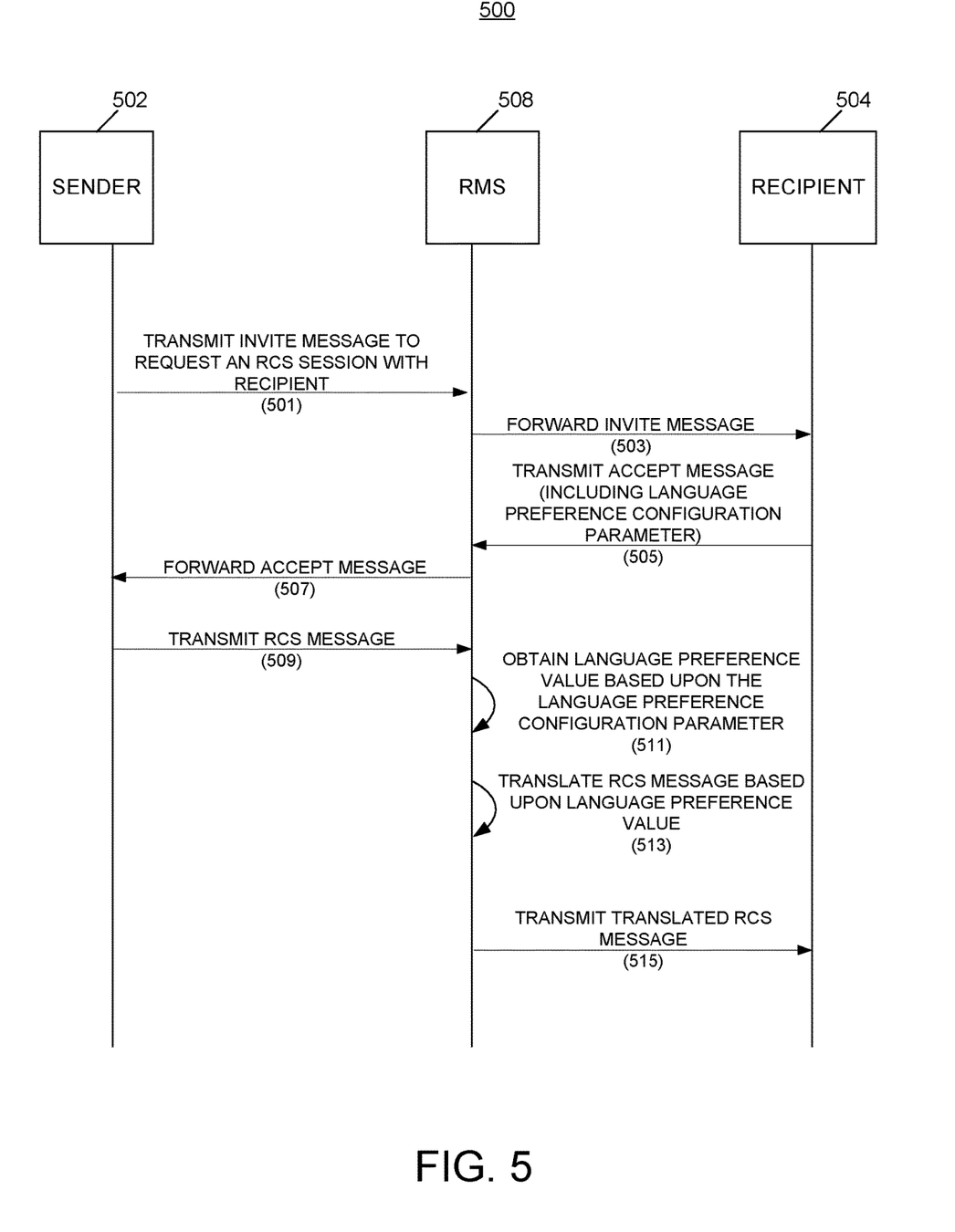
FIG. 5 is a sequence diagram of a message flow, wherein a language preference is included in an accept message according to some implementations.

FIG. 5 illustrates an example message flow 500, wherein a language preference (i.e., a language preference configuration parameter and its associated value) is included in an accept message, according to an embodiment. As shown, sender device 502 (e.g., sender device 102) may transmit (501) an invite message to request an RCS session with recipient device 504 (e.g., recipient device 104). That is, RMS 508 (e.g., RMS 108) may receive the invite message and forward (503) the invite message to recipient device 504. The recipient device 504 may transmit (505) an accept message that includes a language preference configuration parameter in response to the invite message back to the RMS 508, which in turn forwards (507) the accept message on to the sender device 502, thereby establishing an RCS session between the sender device 502 and the recipient device 504. Moreover, RMS 508 is aware of the language preferred by the recipient device 504 (as indicated by the recipient device 504) while establishing the RCS session. The sender device 502 may proceed to transmit (509) an RCS text message to RMS 508, which in turn obtains (511) the language preference value corresponding to the language preference configuration parameter and subsequently translates (513) the RCS text message based upon the language preference value. RMS 508 may proceed to transmit (515) the translated RCS text message to recipient device 504.

With respect to FIGS. 4 and 5, it should be understood that RMS 408 or 508 may be configured to transmit the translated RCS text message (and any subsequent text messages) to the recipient device 404 or 504 without detecting the language preference each time, as long as the RCS session has not expired. If the RCS session has timed out, the RMS 408 or 508 may obtain the language preference in the ways described above with respect to FIGS. 4 and 5.

Figure 6:
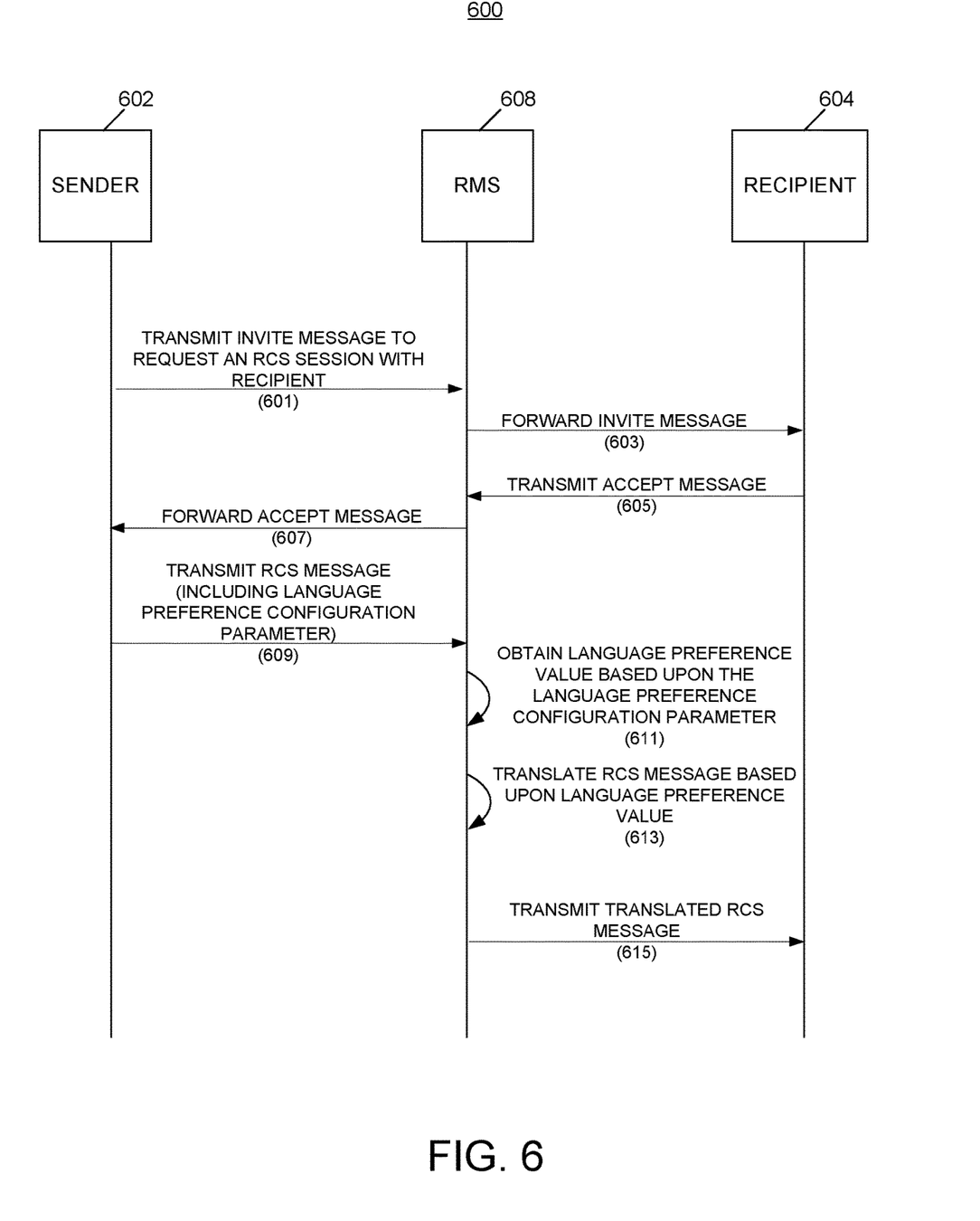
FIG. 6 is a sequence diagram of a message flow, wherein a language preference is included in an RCS message according to some implementations.

FIG. 6 illustrates an example message flow 600, wherein a language preference (i.e., a language preference configuration parameter and its associated value) is included in an RCS message, according to an embodiment. As shown, sender device 602 (e.g., sender device 102) may transmit (601) an invite message to request an RCS session with recipient device 604 (e.g., recipient device 104). That is, RMS 608 (e.g., RMS 108) may receive the invite message and forward (603) the invite message to recipient device 604. The recipient device 604 may transmit (605) an accept message in response to the invite message back to the RMS 608, which in turn forwards (607) the accept message on to the sender device 602, thereby establishing an RCS session between the sender device 602 and the recipient device 604. In contrast to the embodiments described with respect to FIGS. 4-5, RMS 608 is unaware of the language preferred by the recipient device 604 while establishing the RCS session. Instead, the sender device 602 may proceed to transmit (609) an RCS text message that includes a language preference configuration parameter to RMS 608, which in turn obtains (611) the language preference value corresponding to the language preference configuration parameter and subsequently translates (613) the RCS text message based upon the language preference value. RMS 608 may proceed to transmit (615) the translated RCS text message to recipient device 604.

Accordingly, the embodiments described with respect to FIGS. 3-6 above illustrate a "subscription-based" approach for specifying language preferences. That is, either the sender device 102 or the recipient device 104 may specify the language preference configuration parameter with the desired language preference value for each RCS session to instruct the RMS 108 of the appropriate translation language. If either the sender device 102 or the recipient device 104 desires to interact with a different recipient or sender, respectively, the sender device 102 or the recipient device 104 may easily adapt the desired language preference value for a different RCS session.

Figure 7:
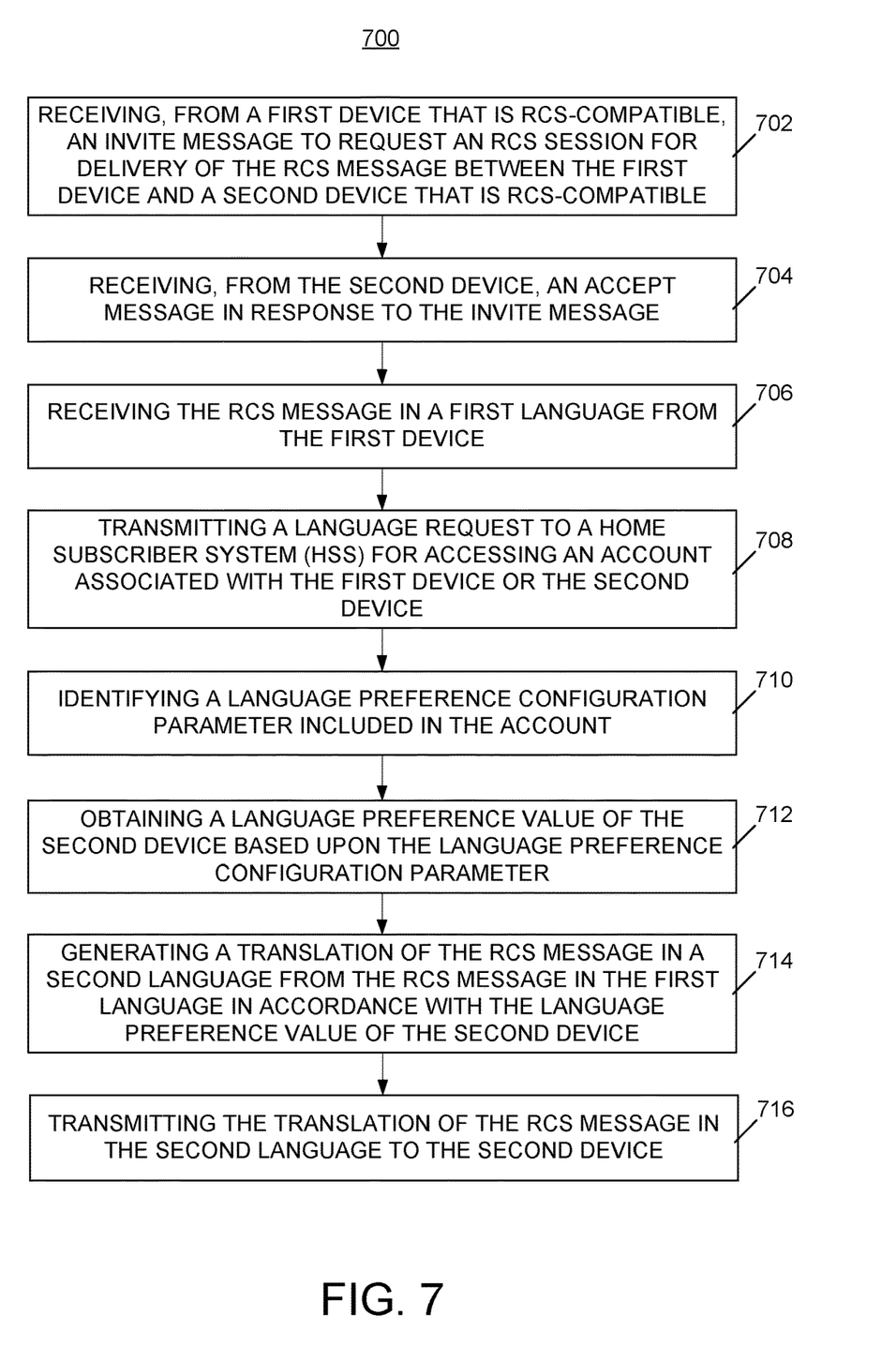
FIG. 7 is a flow diagram illustrating an example method of providing language translation services for messaging between RCS-compatible user devices according to some implementations.

As an alternative "account-based" approach, FIG. 7 illustrates an example method 700, carried out by an RMS 108, of providing language translation services for messaging between RCS-compatible user devices, according to an embodiment. That is, rather than specifying the language preference configuration parameter with the desired language preference value for each RCS session, either the sender device 102 or the recipient device 104 may specify the language preference configuration parameter for all RCS sessions. Particularly, users of the respective sender device 102 or the recipient device 104 may login to their accounts hosted by a home subscriber server (HSS) 112 of the IMS. The HSS 112 may include a master user database that stores subscriber-related information (e.g., subscriber profiles for the sender and receiver). To this end, the HSS 112 is provisioned with subscriber profiles comprising one or more language preferences for each of sender device 102 and recipient device 104. For example, a user of sender device 102 may update his subscriber profile by logging into a service provider web site and specifying language preference values for one or more (or even all) outgoing RCS text messages. As another example, a user of recipient device 104 may update her subscriber profile by logging into a service provider web site and specifying a language preference value for incoming RCS text messages from sender device 102 and, in some instances, specifying another language preference value for one or more incoming RCS text messages from another sender device.

As shown in block 702, the RMS 108 may receive, from an RCS-compatible sender device (e.g., sender device 102), an invite message to request an RCS session for delivery of an RCS text message to an RCS-compatible recipient device (e.g., recipient device 104) in accordance with the SIP standard.

As shown in block 704, upon transmitting the invite message to recipient device 104, RMS 108 may receive an accept message (e.g., "200 OK") in response to the invite message from recipient device 104. Receipt of the accept message signifies that an RCS session has been established between the sender device 102 and the recipient device 104 via the RMS 108, in which case RCS text messages may be exchanged between the UE devices 102, 104 using the Message Session Relay Protocol (MSRP).

As shown in block 706, RMS 108 may receive an RCS text message in a particular language from sender device 102. Upon receipt, as shown in block 708, RMS 108 may transmit a language request to HSS 112 of FIG. 1 via communication link 116 for accessing an account associated with the sender device 102 or the recipient device 104. As shown in block 708, after the HSS responds to RMS 108, RMS 108 may identify a language preference configuration parameter to determine the preferred language of the recipient device 104, i.e., the language into which the RCS text message should be translated.

As shown in block 710, RMS 108 may obtain a language preference value of the recipient device 104 based upon the language preference configuration parameter. The language preference value may be unique to a particular language, and may be in any suitable representation (e.g., bit representation, ASCII representation, country code representation, etc.).

As shown in block 712, RMS 108 may generate a translation of the RCS text message from the original-language RCS text message sent from the sender device 102 to the preferred language in accordance with the language preference value of the recipient device 104. RMS 108 may include a translation module to handle the translation services, or communicate with an external translation service via an API, for example.

As shown in block 714, RMS 108 may transmit the translated RCS message to the recipient device 104. Such transmission may occur via the network 106.

Figure 8:
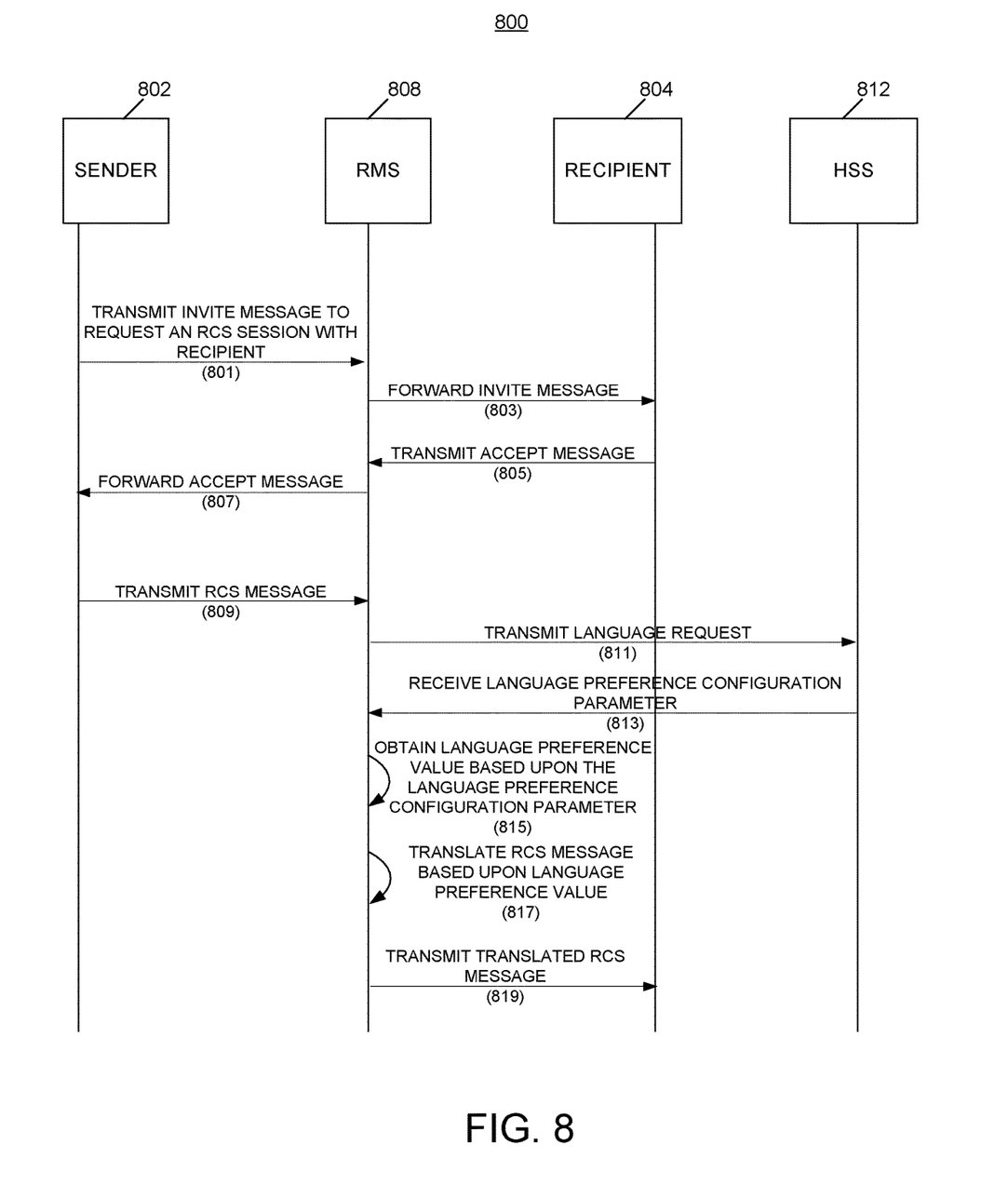
FIG. 8 is a sequence diagram of a message flow, wherein a language preference is provided by an HSS according to some implementations.

FIG. 8 illustrates an example message flow 800, wherein a language preference is provided by an HSS 812 (e.g., HHS 112), according to an embodiment. As shown, sender device 802 (e.g., sender device 102) may transmit (801) an invite message to request an RCS session with recipient device 804 (e.g., recipient device 104). That is, RMS 808 (e.g., RMS 108) may receive the invite message and forward (803) the invite message to recipient device 804. The recipient device 804 may transmit (805) an accept message in response to the invite message back to the RMS 808, which in turn forwards (807) the accept message on to the sender device 802, thereby establishing an RCS session between the sender device 802 and the recipient device 804. The sender device 802 may proceed to transmit (809) an RCS text message to RMS 808, which in turn transmits (811) a language request to HSS 812. HSS 812 retrieves the language preference configuration parameter for either the user of the sender device 802 or the user of the recipient device 804. RMS 808 then receives (813) the language preference configuration parameter from HSS 812. As such, RMS 808 is aware of the language preferred by recipient device 804. Subsequently, RMS 808 obtains (815) the language preference value corresponding to the language preference configuration parameter and subsequently translates (817) the RCS text message based upon the language preference value. RMS 808 may proceed to transmit (819) the translated RCS text message to recipient device 804.

In certain described embodiments, language translation services within the RCS messaging infrastructure facilitate translating a message sent from an RCS-compatible sender device to a legacy recipient device, such as a short message service (SMS)-compatible device. In such embodiments, the RMS may obtain language preferences in any of the manners described above. However, to support legacy recipient devices, the RMS may forward translated messages to a legacy server, such as an SMS center (SMSC), which in turn converts the translated message into a format suitable for the legacy recipient device.

Figure 9:
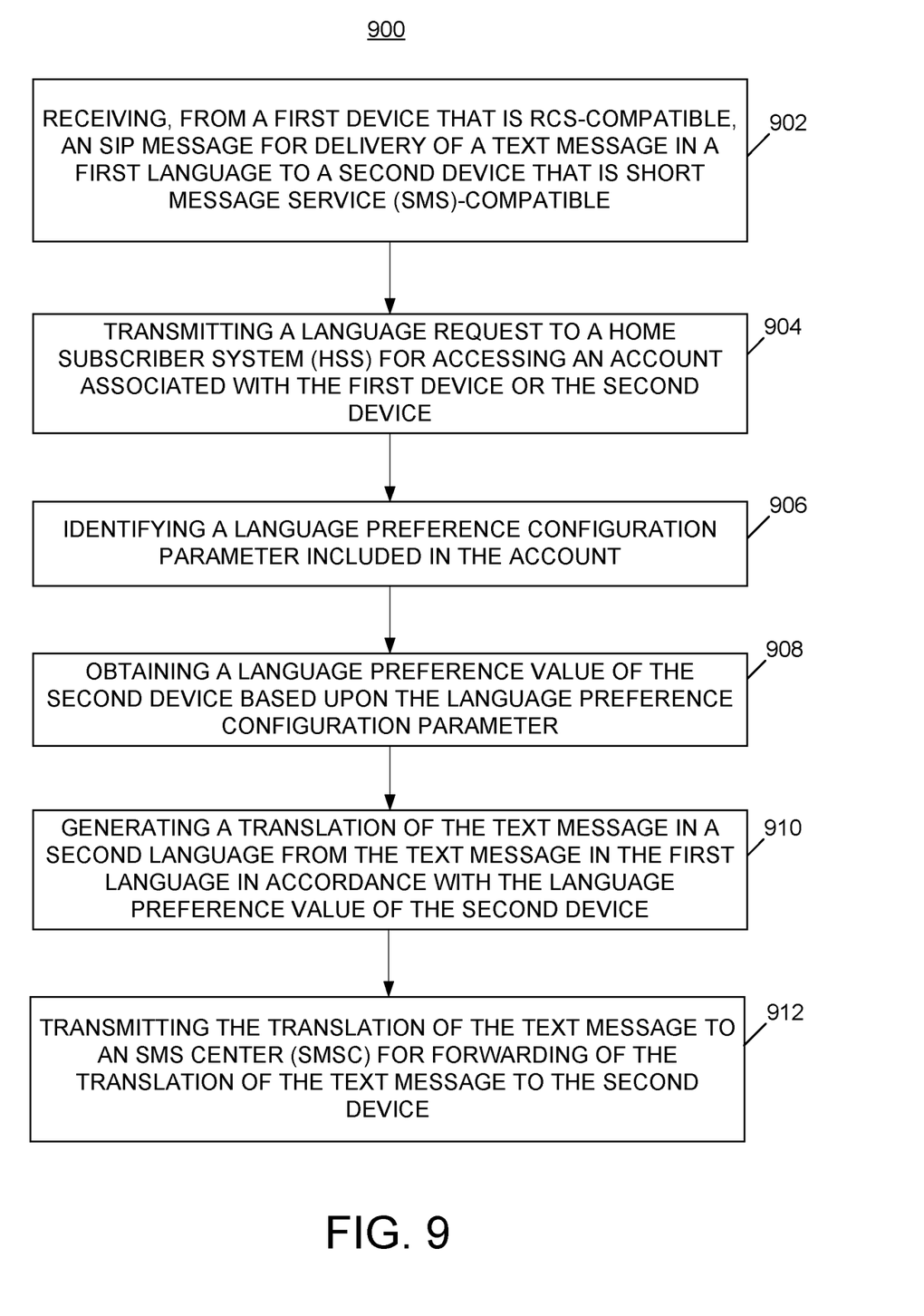
FIG. 9 is a flow diagram illustrating an example method of providing language translation services for messaging between an RCS-compatible user device and a legacy user device according to some implementations.

FIG. 9 illustrates an example method 900 of providing language translation services for messaging between an RCS-compatible user device and a legacy SMS-compatible device, according to an embodiment. Method 900 may be carried out by an RMS (e.g., RMS 108) to enable a text message to be translated and delivered from an RCS-compatible sender device to an SMS-compatible recipient device.

As shown in block 902, an RMS (e.g., RMS 108) may receive, from an RCS-compatible sender device (e.g., sender device 102), an SIP message for delivery of a text message to an SMS-compatible recipient device (e.g., recipient device 104) in accordance with the SIP standard.

As shown in block 904, upon receiving the SIP message in a particular language, RMS 108 may transmit a language request to an HSS (e.g., HSS 112) for accessing an account associated with the sender device 102 or the recipient device 104 and receiving the language preference configuration parameter for the account from HSS.

As shown in block 906, after HSS 112 responds to RMS 108, RMS 108 may identify the language preference configuration parameter to determine the preferred language of the recipient device 104, i.e., the language into which the text message should be translated.

As shown in block 908, RMS 108 may obtain a language preference value of the recipient device 104 based upon the language preference configuration parameter. The language preference value may be unique to a particular language, and may be in any suitable representation (e.g., bit representation, ASCII representation, country code representation, etc.).

As shown in block 910, RMS 108 may generate a translation of the text message from the original-language text message sent from the sender device 102 to the preferred language in accordance with the language preference value of the recipient device 104. RMS 108 may include a translation module to handle the translation services, or communicate with an external translation service via an API, for example.

As shown in block 912, RMS 108 may transmit the translated text message to an SMSC (e.g., SMSC 114) for forwarding of the translation of the text message to the recipient device 104. The RMS 108 or the SMSC 114 may also format the text message into SMS format.

Figure 10:
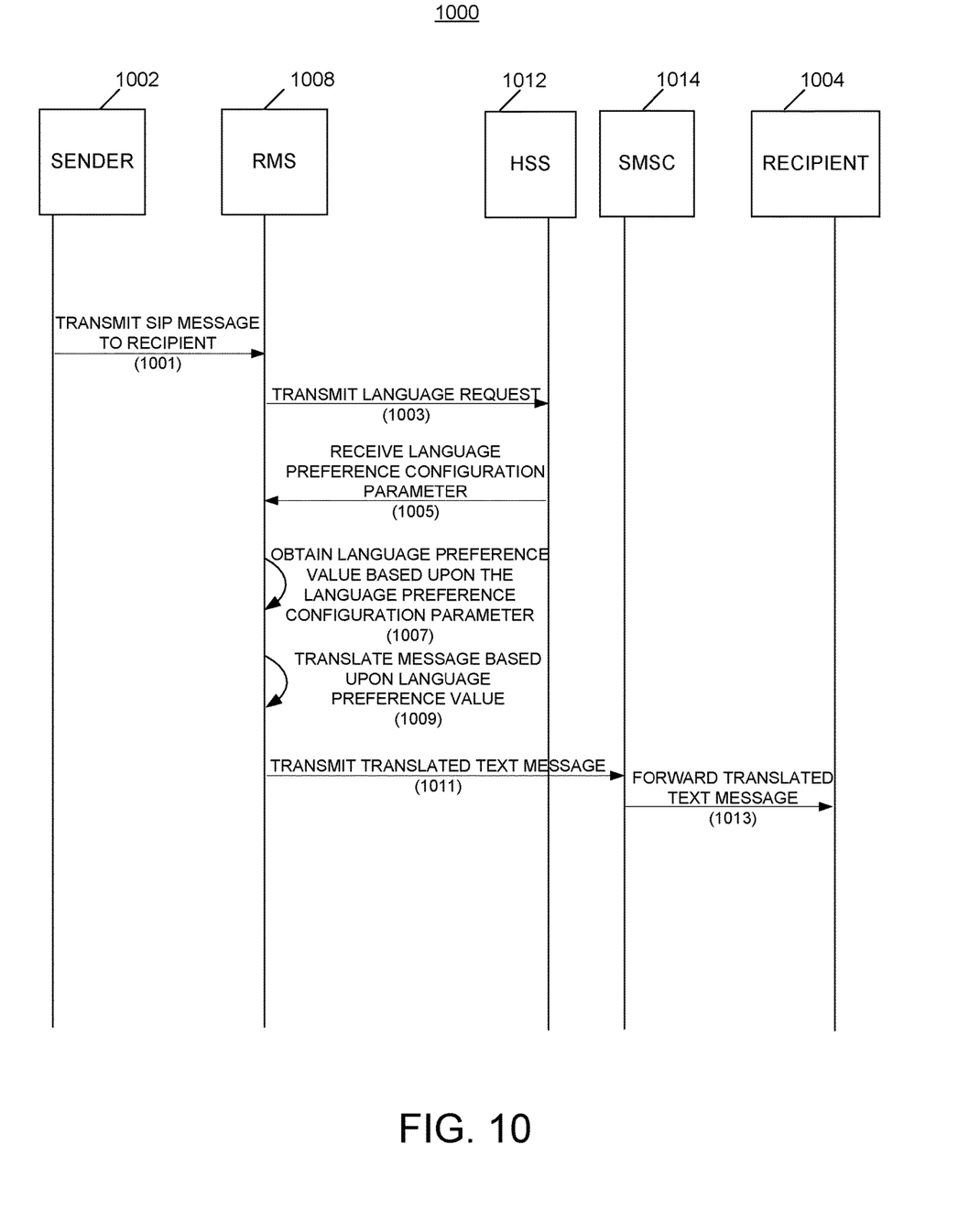
FIG. 10 is a sequence diagram of a message flow between an RCS-compatible user device and a legacy user device according to some implementations.

FIG. 10 illustrates an example message flow 1000 between an RCS-compatible user device and a legacy SMS-compatible user device. As shown, sender device 1002 (e.g., sender device 102) may transmit (1001) an SIP message for delivery of a text message to recipient device 1004 (e.g., recipient device 104). That is, RMS 1008 (e.g., RMS 108) may receive the SIP message and forward (1003) the SIP message to recipient device 1004, ultimately via a legacy server, such as SMSC 1014. Specifically, RMS 1008 may receive the SIP message from sender 1002 and subsequently transmit (1003) a language request to HSS 1012. HSS 1012 retrieves the language preference configuration parameter for either the user of the sender device 1002 or the user of the recipient device 1004. RMS 1008 then receives (1005) the language preference configuration parameter from HSS 1012. As such, RMS 1008 is aware of the language preferred by recipient device 1004. Subsequently, RMS 1008 obtains (1007) the language preference value corresponding to the language preference configuration parameter and subsequently translates (1009) the text message based upon the language preference value. RMS 1008 may proceed to transmit (1011) the translated text message to SMSC 1014, which in turn converts the translated text message into a format suitable for the legacy recipient device.

The embodiments described above may be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly, impliedly, or inherently set forth herein, the order in which the transmissions or operations are described is not intended to be construed as a limitation, and any number of the described transmissions or operations can be combined in any order and/or in parallel to implement the processes. Moreover, structures or operations described with respect to a single server or device can be performed by each of multiple devices, independently or in a coordinated manner, except as expressly set forth herein.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances. For example, although UE devices 102, 104 are generally illustrated as thin clients, such UE devices may perform some functionalities of the RMS and therefore be implemented as thick clients. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be any of X, Y, or Z, or any combination thereof.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. Moreover, in the claims, any reference to a group of items provided by a preceding claim clause is a reference to at least some of the items in the group of items, unless specifically stated otherwise.

Finally, the patent claims at the end of this patent application are not intended to be construed under 35 U.S.C. § 112(f), unless traditional means-plus-function language is expressly recited, such as "means for" or "step for" language being explicitly recited in the claims.

What is claimed is:

1. A computer-implemented method for translating a rich communication services (RCS) message, the method comprising:
   receiving, by one or more processors of an RCS Messaging Server (RMS) and from a first device that is RCS-compatible, an invite message to request an RCS session for delivery of the RCS message between the first device and a second device that is RCS-compatible, wherein the invite message is a Session Initiation Protocol (SIP) message to initiate the RCS session;
   receiving, by the one or more processors of the RMS and from the second device, an accept message in response to the invite message, wherein the accept message is a SIP response message to establish the RCS session;
   receiving, by the one or more processors of the RMS, the RCS message in a first language from the first device;
   identifying, by the one or more processors of the RMS, a language preference configuration parameter included in at least one of the invite message or the accept message;
   obtaining, by the one or more processors of the RMS, a language preference value of the second device based upon the language preference configuration parameter;
   generating, by the one or more processors of the RMS, a translation of the RCS message in a second language from the RCS message in the first language in accordance with the language preference value of the second device; and
   transmitting, by the one or more processors of the RMS, the translation of the RCS message in the second language to the second device.

2. The computer-implemented method of claim 1, wherein the language preference configuration parameter is included in the invite message and wherein identifying the language preference configuration parameter comprises:
   determining the language preference configuration parameter associated with a messaging application native to the first device.

3. The computer-implemented method of claim 1, wherein the language preference configuration parameter is included in the accept message and wherein identifying the language preference configuration parameter comprises:
   determining the language preference configuration parameter associated with a messaging application native to the second device.

4. The computer-implemented method of claim 1, further comprising:
   receiving, by the one or more processors of the RMS and from the first device, a request for delivery of a second RCS message from the first device to the second device, wherein the second RCS message is in the first language;
   determining, by the one or more processors of the RMS, the RCS session has not expired;
   generating, by the one or more processors of the RMS, a translation of the second RCS message in the second language; and
   transmitting, by the one or more processors of the RMS, the translation of the second RCS message in the second language to the second device.

5. The computer-implemented method of claim 1, further comprising:
   receiving, by the one or more processors of the RMS and from the first device, a request for delivery of a second RCS message from the first device to the second device, wherein the second RCS message is in the first language;
determining, by the one or more processors of the RMS, the RCS session has expired;
obtaining, by the one or more processors of the RMS, the language preference value of the second device;
generating, by the one or more processors of the RMS, a translation of the RCS message in accordance with the language preference value of the second device; and
transmitting, by the one or more processors of the RMS, the translation of the RCS message to the second device.

6. The computer-implemented method of claim 1, further comprising:
transmitting, by the one or more processors of the RMS, the RCS message in the first language to the second device.

7. A system for translating a rich communication services (RCS) message, the system comprising:
a first device that is RCS-compatible;
a second device that is RCS-compatible; and
an RCS Messaging Server (RMS) configured to:
receive, from the first device, an invite message to request an RCS session for delivery of the RCS message between the first device and a second device,
wherein the invite message is a Session Initiation Protocol (SIP) message to initiate the RCS session;
receive, from the second device, an accept message in response to the invite message, wherein the accept message is a SIP response message to establish the RCS session;
receive the RCS message in a first language from the first device;
identify a language preference configuration parameter included in at least one of the invite message or the accept message;
obtain a language preference value of the second device based upon the language preference configuration parameter;
generate a translation of the RCS message in a second language from the RCS message in the first language in accordance with the language preference value of the second device; and
transmit the translation of the RCS message in the second language to the second device.

8. The system of claim 7, wherein the language preference configuration parameter is included in the invite message and wherein the RMS is configured to identify the language preference configuration parameter by determining the language preference configuration parameter associated with a messaging application native to the first device.

9. The system of claim 7, wherein the language preference configuration parameter is included in the accept message and wherein the RMS is configured to identify the language preference configuration parameter by determining the language preference configuration parameter associated with a messaging application native to the second device.

10. The system of claim 7, wherein the RMS is further configured to:
receive, from the first device, a request for delivery of a second RCS message from the first device to the second device, wherein the second RCS message is in the first language;
determine the RCS session has not expired;
generate a translation of the second RCS message in the second language; and
transmit the translation of the second RCS message in the second language to the second device.

11. The system of claim 7, wherein the RMS is further configured to:
receive, from the first device, a request for delivery of a second RCS message from the first device to the second device, wherein the second RCS message is in the first language;
determine the RCS session has expired;
obtain the language preference value of the second device;
generate a translation of the RCS message in accordance with the language preference value of the second device; and
transmit the translation of the RCS message to the second device.

12. The system of claim 7, wherein the RMS is further configured to:
transmit the RCS message in the first language to the second device.

13. A non-transitory, tangible computer-readable medium storing machine readable instructions for translating a rich communication services (RCS) message, when executed by one or more processors of an RCS Messaging Server (RMS), cause the one or more processors to:
receive, from a first device that is RCS-compatible, an invite message to request an RCS session for delivery of the RCS message between the first device and a second device that is RCS-compatible, wherein the invite message is a Session Initiation Protocol (SIP) message to initiate the RCS session;
receive, from the second device, an accept message in response to the invite message, wherein the accept message is a SIP response message to establish the RCS session;
receive the RCS message in a first language from the first device;
identify a language preference configuration parameter included in at least one of the invite message or the accept message;
obtain a language preference value of the second device based upon the language preference configuration parameter;
generate a translation of the RCS message in a second language from the RCS message in the first language in accordance with the language preference value of the second device; and
transmit the translation of the RCS message in the second language to the second device.

14. The non-transitory, tangible computer-readable medium of claim 13, wherein the language preference configuration parameter is included in the invite message and wherein the machine readable instructions cause the one or more processors to identify the language preference configuration parameter by determining the language preference configuration parameter associated with a messaging application native to the first device.

15. The non-transitory, tangible computer-readable medium of claim 13, wherein the language preference configuration parameter is included in the accept message and wherein the machine readable instructions cause the one or more processors to identify the language preference configuration parameter by determining the language preference configuration parameter associated with a messaging application native to the second device.

16. The non-transitory, tangible computer-readable medium of claim 13, wherein the machine readable instructions, when executed by the one or more processors of the RMS, further cause the one or more processors to:
- receive, from the first device, a request for delivery of a second RCS message from the first device to the second device, wherein the second RCS message is in the first language;
- determine the RCS session has not expired;
- generate a translation of the second RCS message in the second language; and
- transmit the translation of the second RCS message in the second language to the second device.

17. The non-transitory, tangible computer-readable medium of claim 13, wherein the machine readable instructions, when executed by the one or more processors of the RMS, further cause the one or more processors to:
- receive, from the first device, a request for delivery of a second RCS message from the first device to the second device, wherein the second RCS message is in the first language;
- determine the RCS session has expired;
- obtain the language preference value of the second device;
- generate a translation of the RCS message in accordance with the language preference value of the second device; and
- transmit the translation of the RCS message to the second device.

* * * * *